Oct. 11, 1932.  J. KOZMA  1,882,386
TREAD ATTACHMENT FOR VEHICLE TIRES
Filed June 8, 1932
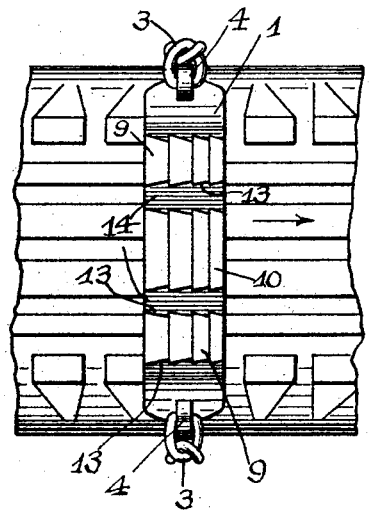
*Fig.1*
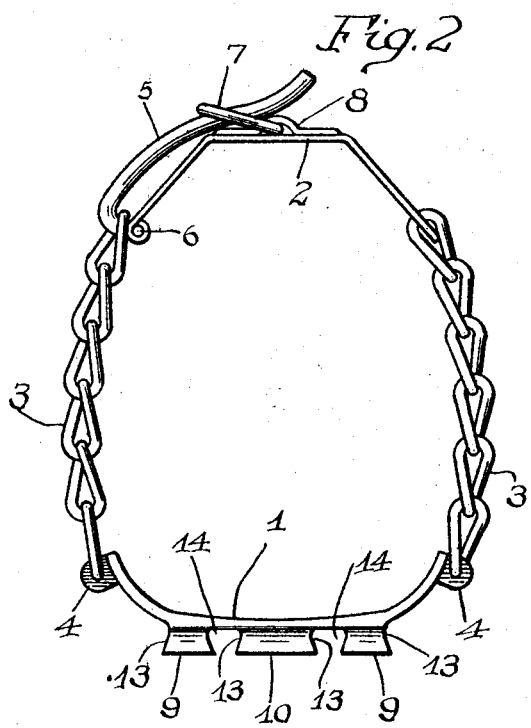
INVENTOR
John Kozma
BY
his ATTORNEY Patented Oct. 11, 1932

1,882,386

UNITED STATES PATENT OFFICE

JOHN KOZMA, OF ROCHESTER, NEW YORK

TREAD ATTACHMENT FOR VEHICLE TIRES

Application filed June 8, 1932. Serial No. 616,056.

My present invention relates to motor driven vehicles and more particularly to soft tired vehicles and it has for its object to provide a simple, efficient and inexpensive tread piece attachment that may be easily and conveniently applied and removed and which will assist in preventing skidding, assist the tractional grip of the wheels and render more quickly effective the slowing action of the brakes. The improvements are directed in part toward providing a device adaptable for greatest efficiency on both snow and ice by simply reversing its position on the wheel.

To these and other ends, the invention resides in certain improvements and combinations of parts, all as will be hereinafter more fully described, the novel features being pointed out in the claim at the end of this specification.

In the drawing:

Fig. 1 is a plan view of a fragment of a pneumatic tired wheel with a tread attachment constructed in accordance with and illustrating one embodiment of my invention in position thereon;

Fig. 2 is an elevation of the device, detached, and

Fig. 3 is a side view of the wheel fragment of Fig. 1, showing a corresponding elevation of the attachment.

Similar reference numerals throughout the several views indicate the same parts.

Referring more particularly to the drawing, the major elements of my device comprise an arcuate tread plate 1, a felly saddle 2 and side chains 3 connecting these parts. Corresponding ends of the chains 3 turn in lugs 4 on the plate and one of the other two ends is similarly loosely connected to the saddle 2, while the other chain end engages within the elbow of a hooked latch lever 5 hinged to the saddle at 6 to draw the chain tight with the advantage of leverage in a familiar manner. The free end of the lever is latched within a swinging link 7 held by a strap 8 at the center of the saddle. By this means, the attachment may be easily and quickly secured to the wheel or reversed thereon for the purposes hereinafter described, the saddle 2 conforming substantially to the inner side of the felly F holding tread plate 1 so that it extends with its length disposed transversely across the tire tread.

The lug carrying ends of the plate conform in curvature with the sides or cheeks of the tire so that they will assume, in part at least, the side thrusts thereof. In the center portion of the plate on its outer side is a group of preferably integral teeth in transverse rows, there being two relatively narrow outer rows 9 and an inner or central relatively broad row 10. These come to practically a knife edge, which edges run longitudinally of the plate and transversely of the tread. The faces thereof, which are intersected by the plane of rotation of the wheels, are respectively undercut, as indicated at 11, and backed off, as indicated at 12 to present the edge at an inclination. In the adjustment shown in the figures, this inclination is in the direction of travel of the wheel at the point of ground contact or opposite to the direction of rotation, as shown by the arrows. The side edges of the teeth are undercut, as indicated at 13, the inner such faces being so formed by dovetail transverse grooves 14.

The application of the attachment to the wheel in the position of the drawing is best for an icy surface, such as is produced by sleet or melted snow, the theory of operation being that the backed off sides 12 of the teeth, though in rear of the forwardly inclined or forwardly projecting gripping edges gives sufficient traction for forward progress on the hard ice surface, while if the brakes are applied these edges cut in to the ice surface in the manner of a chisel and quickly lock the wheel to the ground. Under the condition of a deep snow covered road, however, the attachment is reversed so that the teeth point rearwardly to give a better tractional grip as the wheel tends to slip under its power in the yielding snow. The backed off faces take sufficient hold in the softer snow for braking purposes.

In both instances, the undercut side faces 13 are most effective to prevent side skidding.

I claim as my invention:

In a tread attachment for vehicle tires, the combination with a rim attaching means, of an arcuate tread plate adapted to extend across the tire tread and to hug the sides thereof being secured to the rim attaching means at its ends, the intermediate portion of said plate being occupied by a group of projecting teeth in longitudinal and transverse rows, the opposite sides of which teeth that are intersected by the plane of rotation of the wheel being respectively undercut and backed off and the other sides being undercut for the purposes set forth.

JOHN KOZMA.